3,835,068
CATALYST PREPARATION
Kennard Dungan West, Morton, Pa., assignor to Air
Products and Chemicals, Inc., Allentown, Pa.
No Drawing. Filed July 25, 1972, Ser. No. 274,898
Int. Cl. B01j 11/40
U.S. Cl. 252—455 Z
19 Claims

ABSTRACT OF THE DISCLOSURE

By firing a powdered blend of one or more metals or alloys thereof with an expandable crystalline siliceous zeolite, catalytic structures are prepared which promote reduction of $NO_x$ to less noxious vapor form. The obtained catalytic structures comprising a catalytic metal or alloy thereof intimately associated with or in a low density ceramic matrix are useful in treatment of exhaust gas from internal combustion engines containing noxious oxides of nitrogen ($NO_x$) particularly NO.

BACKGROUND OF THE INVENTION

Air Pollution by Automobile Exhaust

Pollution of the atmosphere by offensive vapor emissions from industrial plants and from automobile engine exhausts are of major and universal concern in industrialized countries. Governmental regulations and proposed standards have been promulgated in this country by the Federal government and by certain of the states aimed at reduction of atmospheric pollution from these sources and vast expenditures of effort in accelerated research and development programs are being exerted in a major effort to achieve compliance with adopted or recommended requirements for abatement of pollutants.

With respect to pollution of the atmosphere by automobile exhaust gases, the principal pollutants at which regulation is directed are: unburned hydrocarbons, carbon monoxide and nitrogen oxide gases, the latter being designated $NO_x$ and comprises principally nitric oxide (NO). Residual hydrocarbons and carbon monoxide in exhaust gas are products resulting from incomplete combustion whereas $NO_x$ is formed by the combustion process. By redesign or adjustment of present motor vehicle engines (higher flame temperatures and/or higher fuel-air ratios) more complete combustion can be obtained but only at the expense of promoting increased production of $NO_x$. The production of the latter gas is at its peak when the fuel mixture is slightly leaner than stoichiometric. In present newer automobiles $NO_x$ production in a properly adjusted engine has been reduced to about 4 grams per vehicle mile but may run as high as 6 to 7 grams per mile in older or improperly adjusted engines. While carbon monoxide production approaches its lowest levels at an air-fuel ratio of about 15 or 16, at this ratio $NO_x$ production is nearing its peak. On the other hand $NO_x$ production can be brought to the range of 1.5 to 2.0 grams per vehicle mile at an air-fuel ratio of about 18; at this high ratio, however, operating difficulties are encountered, such as misfiring and engine stalling, causing poor performance with attendant increased emissions of carbon monoxide and unburned hydrocarbons.

By adjustment of the air-fuel mixture with other modifications in ignition and timing to obtain lower flame temperature at reliable engine performance, decrease in $NO_x$ production can in some measure be achieved; however even under these conditions at best there is a corresponding increase in the unburned hydrocarbon content of the product gas.

Notwithstanding the foregoing difficulties the problems of carbon monoxide and residual hydrocarbons in motor vehicle exhaust gases have been largely solved by techniques such as air injection in the exhaust manifold and by the development of effective catalytic compositions promoting combustion and/or oxidation of these emission products in a catalytic convertor associated with the motor vehicle exhaust system. The problem of gas emission during cold engine startup has not as yet been fully and satisfactorily overcome. On the other hand, while a number of catalysts and catalytic systems have been proposed to take care of $NO_x$ in motor vehicle exhaust gas, none of these heretofore proposed has been found sufficiently durable and effective over a practical lifetime of operation. Development of a better catalyst for conversion of $NO_x$ to less noxious products constitutes one of the urgent needs in the program for abatement of atmospheric pollution. These oxides of nitrogen are probably the pollutants in the atmosphere most detrimental to health, of which automobile exhaust contributes 15 to 70% of that present. The problem of cold engine starting has in the opinion of many investigators, been overly emphasized, since this factor contributes less than 5% of the total hydrocarbon and carbon monoxide emission from automobiles; moreover the initial combustion products on startup are rather low in content of $NO_x$.

The standards set by the amendments to the Clean Air Act of 1970 to be met by the automotive industry by 1975–76 provide for a 90% reduction in $NO_x$ emission, which means that the emission of this component of exhaust gas will have to be brought down from its present level to about 0.4 grams per vehicle mile. Of the thousands of catalysts tested, of which some have been found initially effective, none have shown promise of maintaining effective activity during use for as much as 10,000 vehicle miles. For that reason the automotive industry has sought lowering of the set standards and acceptance for the immediate future of substantially higher levels of $NO_x$ emission.

The principal oxide of nitrogen present in motor vehicle exhaust gases is nitric oxide (NO). By decomposition of nitric oxide there is theoretically obtained innocuous elemental gases according to the reaction (I)  $2NO \rightarrow N_2 + O_2$ In the presence of hydrogen in sufficient quantity, free nitrogen and ammonia would be formed (at below $NH_3$ decomposition temperature) according to the theoretical reaction (II)  $4NO + 7H_2 \rightarrow 2NH_3 + N_2 + 4H_2O$ Among the numerous catalysts tested, those showing best promise in initial promotion of the decomposition of nitrogen oxides (I) were found to be either too soft physically and/or were rapidly deactivated. Some of these end others were unacceptable because they were easily sintered at temperatures prevailing in motor vehicle exhaust systems with consequent loss of activity.

Because of the foregoing drawbacks encountered in connection with catalysts having activity in promoting decomposition of nitrogen oxides (I) and since hydrogen is ordinarily present in exhaust gas from hydrocarbon fuel combustion as a result of the water gas shift reaction, emphasis in the experimental program leading to the present invention was directed to the development of suitable catalysts effective in reduction of these oxides of nitrogen (II).

OBJECTS OF THE INVENTION

Among the objectives of the present invention is the provision of novel catalysts overcoming the undesirable features of earlier proposed catalysts for conversion of nitrogen oxides. The novel catalysts prepared in accordance with the invention, are physically strong and durable, highly active for the proposed conversion of $NO_x$ in the presence of hydrogen and other components of exhaust gas from combustion of hydrocarbons in motor fuels, and retain their useful activity over practical periods of normal use.

SUMMARY OF THE INVENTION

The novel catalysts of the invention are prepared by controlled heating of a powdered blend of (1) a crystalline alkali or alkaline earth metal synthetic aluminosilicate zeolite having compositional hydroxyl groups with (2) one or more hard, heavy metals of relatively high melting point (above 1950° F.) or of natural or synthetic alloys of such metals which alloys are of relatively high melting point. The blended powders are heated in a range causing fusion of said zeolite with accompanying dehydroxylation, thereby effecting foaming of said zeolite. There is thus obtained a catalytic structure comprising the metal or alloy intimately dispersed and bound in a low density, porous ceramic foam matrix having structural strength and rigidity.

Preferred among the metals and alloys which are to be used in preparation of the novel catalysts are those which are relatively abundant and commercially available at low cost as metal powders. These comprise generally heavy base metals of Groups I and VIII of the Periodic Table, principally copper, iron and nickel, and alloys predominating in one or more of these. Familiar alloys of iron that can be employed are the well-known stainless steel compositions. These contain iron, with or without nickel, associated with chromium, and may further contain small amounts of other metals such as manganese, molybdenum and silicon. Among the useful nickel alloys are those of the Monel metal type, which comprise chiefly nickel associated with copper and which may further contain small amounts of other metals, such as iron, manganese, and silicon. Natural Monel metal alloys are obtained by refining of copper-nickel ores.

The production of low density porous ceramic foam from crystalline zeolites is described by Flank et al. in U.S. Pat. No. 3,574,647 issued Apr. 13, 1971. The zeolite types described in that patent can be used in practice of the present invention. These embrace the familiar aluminosilicate molecular sieve structures and include commercially available calcium-exchanged sodium zeolite such as that known in the trade as 5A zeolite; alkaline earth metal exchanged X-type zeolites such as the calcium-exchanged zeolite commercially available as 10X zeolite; and other synthetic sodium zeolites such as those of the 4A type suitably exchanged with alkaline earth cations. All of these zeolite types fuse and expand by dehydroxylation (are blown) when heated to a temperature in the range of 1550 to 2200° F. These crystalline zeolites are relatively free of alkali and alkaline earth metal components in other than base exchange position in the crystal lattice. In the ion exchange position these contain an amount of alkali and alkaline earth metal cations contributing to their fusion in the indicated temperature range; effective amounts of such cations are in the equivalency proportions of 50 to 90% CaO to 10 to 50% $Na_2O$.

The zeolite used as starting material further must contain, exclusive of externally held water, a concentration of hydroxyl ions in the order of 0.2 to 3.0% by weight of the zeolite, to provide on heating to the fusion temperature range a release of water vapor by dehydroxylation, which acts as the blowing or foaming agent. The crystalline zeolite starting material passes through an intermediate amorphous phase during the fusion and simultaneously with dehydroxylation is transformed to a different crystalline non-zeolitic structure of low density having a fusion temperature of 90° or more above that of the starting zeolite. The new crystalline ceramic product is thus stabilized or set as a low density, porous foamed structure.

In preparation of catalyst bodies in accordance with the invention, 5 to 25 parts by weight of the metal or alloy in finely divided powder form is thoroughly dry blended with 95 to 75 parts of the powdered zeolite. Larger amounts of the metal or alloy can be employed but at the risk of possibly obtaining a structurally weaker fused product. The blend is packed or screened into a mold of desired configuration and placed in a heated oven or furnace wherein the mold contents are brought to and held at a temperature in the range at which the zeolite is fused, to set the resulting fused structure as the desired low density, blown ceramic matrix having the metallic powder dispersed therein. For the calcium-exchanged 5A type zeolite the preferred heating temperature is in the range of 1650–2100° F. The heated product should be held at the attained fusion temperature range for at least fifteen minutes and then permitted to cool down gradually to avoid shock temperature effects.

DETAILED DESCRIPTION OF THE INVENTION

The invention will be better understood from the specific embodiments hereinafter described, these being included for illustration and not intended as limitations.

Example I 704 parts by weight of a commercial calcium-exchanged sodium aluminosilicate, identified commercially as 5A zeolite, was dry-blended with 78 parts of stainless steel metal powder (Glidden 316–L prealloyed powder, through 325 mesh) in a V-blender for fifteen minutes. The blended powder was loaded by screening into a nine-inch diameter quartz ring set in a quartz tray to a bed depth of approximately of 1½ inches. The tray was then placed in an electric furnace which had been preheated to about 1300° F. and the furnace and contents then brought to 1850° F. (which took approximately two hours). The tray and contents were held at this temperature for an additional half-hour. A foamed coherent ceramic disk was formed in the mold containing about 10% stainless steel metal dispersed in the ceramic matrix.

The stainless steel metal powder employed was of the following composition:

| | Percent by weight |
|---|---|
| Fe | 66.45 |
| Ni | 13.55 |
| Cr | 16.76 |
| Mo | 2.18 |
| Mn | 0.14 |
| Si | 0.83 |
| C | <0.05 |
| S | <0.05 |

Example II 704 parts by weight of the commercial zeolite 5A used in the preceding example were intimately dry blended with 78 parts of Monel metal powder (Glidden CN–1 copper-nickel powder, through 325 mesh) and the blended powders loaded to a depth of 1½ inches into a nine-inch diameter quartz ring set in a quartz tray. The mold was heated in the same manner and at the temperature described in the preceding example, forming a foamed coherent ceramic disk containing about 10% Monel metal powder dispersed therein.

The Monel metal powder used had the following composition:

| | Percent by weight |
|---|---|
| Copper | 30.10 |
| Nickel | 68.45 |
| Iron | 0.28 |
| Manganese | 0.08 |
| Carbon | <0.02 |
| Silicon | 1.07 |
| Sulfur | <0.02 |

While in the foregoing examples the product was molded into a single monolithic structure of disk shape, it will be understood that the particlar configuration is immaterial to the present invention. Molded products of any desired shape may be formed from the composited powders and these products may be drilled or cut to desired design. Moreover, if desired, the powdered compositions of the present invention can be formed in known manner into pellets of desired size and these pellets subjected to fusion in the manner heretofore described.

The catalytic activity of the individual catalyst bodies of Examples I and II was determined by flowing a gas composition containing NO and hydrogen thereover at selected temperature levels and determining the extent of conversion of NO and by analyses of the effluent for measurement of the amounts of nitrogen and other reduction products obtained at the several temperature levels. The quantity of ammonia formed in the reaction was determined by passing the reduced effluent with oxygen over catalyst comprising 0.9% Pt on alumina, to convert the ammonia by oxidation, and the quantity of NO thus formed being a measure of the ammonia content of the initial reduced effluent. This technique required careful adjustment of the oxygen flow rate for reliable $NH_3$ determination.

To carry out the test runs, separate gas cylinders were provided equipped with flow control valves to obtain feed gas mixtures approximating desired composition. These separate cylinders contained by volume (a) 2% NO in helium; (b) 2.5% CO, 2.5% $H_2$, 375 p.p.m. propylene, in helium; (c) 20% $O_2$ in helium. A quartz reactor was set up equipped with a sampling valve for gas chromatographic analysis.

In all of the runs a catalyst volume of 3 cc. was employed and the gas stream passed through at a total flow rate of 750 ml./minute. For the gas anaylsis, $NO_2$, $NH_3$, and product $H_2O$ were trapped out at about $-60°$ C. by a guard column of glass beads coated with silicone.

In the initial series of runs a feed gas composition was employed free of oxygen.

Example III

A feed gas of the composition set out below was passed over the catalyst of Example II at the temperature levels noted and with the results indicated in Table 1 below:

Feed Gas Composition (Percent by vol.)

NO ---------------------------------- percent-- .329
$O_2$ ---------------------------------- do---- .000
$H_2$ ---------------------------------- do---- 2.30
CO ---------------------------------- 2.05
$C_3H_6$ ---------------------------------- p.p.m-- 252
Helium ---------------------------------- Balance

TABLE 1

| °F. | Concentration, mol percent | | | | Conv. NO, mol percent | Yield $N_2$,* per cent | Conc. $NH_3$, mol percent |
|---|---|---|---|---|---|---|---|
| | NO | $N_2$ | $H_2$ | CO | | | |
| 1,500 | .0000 | .1488 | 2.20 | 2.01 | 100.0 | 90.0 | .000 |
| 1,200 | .0000 | .1323 | 2.18 | 2.06 | 100.0 | 80.0 | .011 |
| 900 | .0000 | .0917 | 1.88 | 2.05 | 100.0 | 55.3 | .041 |
| 600 | .0000 | .0674 | 1.95 | 1.92 | 100.0 | 40.6 | .205 |

*$N_2$ yield = $2 \times N_2$ in product divided by percent NO in feed.

In the foregoing and in other runs described below passing of the reduced effluent from the NO reducing reactor into the second reactor containing the platinum catalyst for $NH_3$ deterination, there was simultaneously effected substantially complete conversion of CO to $CO_2$ when sufficient oxygen was present.

Example IV

The feed gas of the composition set out below was passed over the catalyst of Example I at the temperatures and with the results shown in Table 2 below:

Feed Gas Composition (Percent by vol.)

NO ---------------------------------- .334
$O_2$ ---------------------------------- .001
$H_2$ ---------------------------------- 2.24
CO ---------------------------------- .88
$C_3H_6$ ---------------------------------- p.p.m-- 270
Helium ---------------------------------- Balance

TABLE 2

| °F. | Concentration, vol. percent | | | | Percent | | Conc. $NH_3$, vol. percent |
|---|---|---|---|---|---|---|---|
| | NO | $N_2$ | $H_2$ | CO | Conv. NO | Yield $N_2$ | |
| 1,500 | .0000 | .1372 | 2.11 | 0.85 | 100.0 | 81.9 | .038 |
| 1,200 | .0000 | .1263 | 2.02 | 0.85 | 100.0 | 75.3 | .007 |
| 900 | .0000 | .0676 | 1.91 | 0.82 | 100.0 | 40.2 | .000 |
| 600 | .2536 | .0135 | 2.19 | 0.89 | 24.8 | 8.1 | |

In the next series of runs an oxygen-containing feed gas was used.

Example V

The feed gas of the composition set out below was passed over the catalyst of Example I at the temperatures and with the results shown in Table 3 below:

Feed Gas Composition (Percent by vol.)

NO ---------------------------------- .256
$O_2$ ---------------------------------- .542
$H_2$ ---------------------------------- 2.34
CO ---------------------------------- 2.02
$C_3H_6$ ---------------------------------- p.p.m-- 248
Helium ---------------------------------- Balance

TABLE 3

| °F. | Concentration | | | | | | Conv. NO | Yield $N_2$ | Conc. $NH_3$ |
|---|---|---|---|---|---|---|---|---|---|
| | NO | $N_2$ | $O_2$ | $H_2$ | CO | $CO_2$ | | | |
| 1,500 | .0000 | .1234 | .001 | 1.28 | 1.46 | .235 | 100.0 | 94.4 | .007 |
| 1,200 | .0000 | .1122 | .001 | 0.95 | 1.78 | .174 | 100.0 | 85.8 | .013 |
| 900 | .0000 | .0626 | .000 | 0.91 | 1.75 | .212 | 100.0 | 47.8 | .056 |
| 600 | .0867 | .0118 | .212 | 1.90 | 1.90 | .115 | 66.7 | 9.1 | |

Note.—Gas concentrations in mol percent.

Example VI

A feed gas composition as set out below was passed over the catalyst of Example II at the temperatures and with the results reported in Table 4 below:

Feed Gas Composition (Percent by vol.)

NO ---------------------------------- .254
$O_2$ ---------------------------------- .576
$H_2$ ---------------------------------- 2.32
CO ---------------------------------- 2.00
$C_3H_6$ ---------------------------------- p.p.m-- 246
Helium ---------------------------------- Balance

TABLE 4

| °F. | Concentration | | | | | | Conv. NO | Yield $N_2$ | Conc. $NH_3$ |
|---|---|---|---|---|---|---|---|---|---|
| | NO | $N_2$ | $O_2$ | $H_2$ | CO | $CO_2$ | | | |
| 1,500 | .0000 | .1257 | .001 | 1.49 | 1.41 | 1.827 | 100.0 | 98.7 | .000 |
| 1,200 | .0000 | .1220 | .000 | 1.21 | 1.58 | 0.329 | 100.0 | 94.2 | .000 |
| 900 | .0000 | .0629 | .000 | 0.89 | 1.67 | 0.273 | 100.0 | 48.4 | .059 |
| 600 | .2359 | .0149 | .002 | 1.90 | 1.01 | 0.712 | 8.3 | 11.6 | |

Note.—Gas concentrations in mol percent.

In control experiments to determine the effect of the ceramic foam matrix, the catalytic activity of the Monel metal composition of Example II and of the Stainless steel composition of Example I were each tested without matrix using an oxygen-containing feed gas as was done in Examples V and VI. (The precise compositions of the feed gas were not identical but the variations are not significant.) The nitrogen yields of the metal alloys alone are compared with those obtained using the catalysts of Examples I and II in Table 5 below:

TABLE 5

| | Degrees F. | | | | | NO in feed |
|---|---|---|---|---|---|---|
| | 1,500 | 1,400 | 1,200 | 900 | 600 | |
| A. Ex. II catalyst | 98.7 | | 94.2 | 48.4 | 11.6 | .254 |
| B. Monel unsupp | | 68.7 | 50.6 | 45.0 | 13.3 | .276 |
| C. Ex. I catalyst | 94.4 | | 85.8 | 47.8 | 9.1 | .256 |
| D. Stainless steel unsupp | | 58.7 | 29.5 | 5.1 | 0 | .266 |
| E. Monel monolith | | 70.0 | 56.6 | 55.3 | 25.9 | .298 |

To determine the stability of the catalysts of Examples I and II, each of these was given an accelerated life test run by continuous passing of the feed gas over the catalyst at 1400° F. over a 48 hour period and analyzing samples of the gas effluent in approximately four hour intervals. Throughout the 48 hour period the NO conversion remained at 100%. Nitrogen yields remained fairly constant as shown in Table 6 below:

TABLE 6

| | Run F | Run G |
|---|---|---|
| Feed gas comp.: | | |
| NO, vol. % | .284 | .259 |
| $O_2$ | .617 | .477 |
| CO | 2.21 | 1.61 |
| $H_2$ | 2.24 | 1.23 |
| $C_3H_6$, p.p.m | 281 | 272 |
| | Ex. II cat. | Ex. I cat. |
| $N_2$ yields | 81.7 | 78.5 |
| | 77.3 | 79.2 |
| | 78.1 | 78.5 |
| | 78.6 | 77.8 |
| | 77.6 | 78.5 |
| | 77.1 | 78.3 |
| | 76.6 | 77.7 |
| | 77.7 | 75.7 |
| | 79.6 | 78.1 |
| | 80.7 | 78.5 |
| | | 77.7 |

From the foregoing reported results it is apparent that 100% conversion of NO by reduction over catalysts of the invention is readily obtained at temperatures of 900° F. and above. Moreover these catalysts exhibit excellent stability as indicated by the 48 hour test runs, wherein 100% conversion of NO and high $N_2$ yields are maintained throughout, without noticeable deactivation of the catalyst.

The fact that little or no ammonia shows up in the product effluent from reduction of NO at 1400° F. and above on most catalysts has been attributed to thermal decomposition of the $NH_3$ into $H_2$ and $N_2$ at these temperatures. The relatively low activity of the proposed catalysts, as well as that of others reported in the literature, at low temperature (below 600° F.) has little significance, since when an automobile engine is operating cold relatively little NO is being exhausted.

The maintenance of substantially 80% $N_2$ yield over a 48 hour period obtained in NO reduction with the proposed catalysts represents a substantial forward step in the art. It is believed that removal of 90% of the NO, herein achieved, would correspond roughly to lowering $NO_x$ emission from automobile engines from the present 4 grams/vehicle mile to near 0.4 grams/vehicle mile.

What is claimed is:

1. The method of catalyst preparation which comprises heating a dry finely-divided blend of a crystalline aluminosilicate zeolite with a heavy, hard catalytic base metal of high melting point, or a catalytic alloy of such metal, to the fusion temperature range of said zeolite, whereby said crystalline zeolite passes through an intermediate amorphous state and is transformed by dehydroxylation into a new non-zeolitic crystalline form of expanded structure having said metal or alloy dispersed therein; said starting crystalline zeolite being characterized by a compositional hydroxyl content in the range of 0.2 to 3.0% by weight of the zeolite and having at its base exchange positions ions from the group consisting of alkali and alkaline earth metal ions.

2. The method in accordance with Claim 1 wherein said metal is one selected from the Groups I and VIII of the Periodic Table.

3. The method in accordance with Claim 1 wherein an alloy is employed predominating in iron.

4. The method of Claim 3 wherein said alloy is a Stainless steel.

5. The method in accordance with Claim 1 wherein an alloy is employed predominating in nickel.

6. The method of Claim 5 wherein said alloy is composed chiefly of nickel and copper.

7. The method of Claim 5 wherein said alloy is a Monel metal composition.

8. The method of Claim 1 wherein said blend is heated to a temperature in the range of 1650–2100° F. and held at such temperature for at least fifteen minutes.

9. The method of Claim 1 wherein said blend is deposited in a shaping mold and while therein is subjected to heating at temperature in the range of 1550–2200° F. for at least fifteen minutes, followed by gradual cooling.

10. The method of Claim 1 wherein said starting zeolite is a 5A molecular sieve.

11. The method of producing a durable low density catalyst structure which comprises depositing into a shaping mold a dry blend of 5A zeolite and catalytic Monel metal powders, heating the blend in the temperature range of 1650–2100° F. for at least fifteen minutes to effect fusion and expansion of said zeolite, and permitting the obtained fused product to cool down gradually.

12. The method of producing a durable low density catalyst structure which comprises depositing into a shaping mold a dry blend of 5A zeolite and catalytic Stainless steel powders, heating the blend in the temperature range of 1650–2100° F. for at least fifteen minutes to effect fusion and expansion of said zeolite, and permitting the obtained fused product to cool down gradually.

13. Catalyst comprising a hard, heavy catalytic base metal of high melting point or a catalytic alloy predominating in such metal, intimately dispersed throughout a low density porous ceramic matrix composed of a fusion-blown foamed crystalline alkaline earth metal aluminosilicate, said aluminosilicate having zeolitic properties prior to fusion.

14. The catalyst of Claim 13 wherein said alloy is one predominating in iron.

15. The catalyst of Claim 14 wherein said alloy is a Stainless steel.

16. The catalyst of Claim 13 wherein said alloy is one predominating in nickel.

17. The catalyst of Claim 16 wherein said alloy is Monel metal.

18. Catalyst according to Claim 13 wherein said metal or alloy constitutes about 5 to 25% by weight of the catalyst.

19. Catalyst according to Claim 17 wherein said Monel metal constitutes about 10% by weight of the catalyst.

References Cited

UNITED STATES PATENTS

| 3,140,253 | 7/1964 | Plank et al. | 208—120 |
| 3,574,647 | 4/1971 | Flank et al. | 106—40 |
| 3,013,984 | 12/1961 | Breck | 252—455 Z |
| 3,013,986 | 12/1961 | Castor | 252—455 Z |
| 3,013,987 | 12/1961 | Castor et al. | 252—455 Z |
| 3,498,928 | 3/1970 | Cho et al. | 252—455 Z |

CARL F. DEES, Primary Examiner

UNITED STATES PATENT AND TRADEMARK OFFICE
CERTIFICATE OF CORRECTION

PATENT NO. : 3,835,068
DATED : September 10, 1974
INVENTOR(S) : Kennard Dungan West It is certified that error appears in the above-identified patent and that said Letters Patent are hereby corrected as shown below:

Column 2, Line 56
    Delete "end" and substitute therefor -- and --

Column 5, Line 50
    Delete "$Q_2$" and substitute therefor -- $O_2$ --

Column 5, Line 73
    Delete "deterination" and substitute therefor -- determination --

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*